April 4, 1944. W. P. HILL Re. 22,465

METHOD AND APPARATUS FOR SHAPING MEMBERS

Original Filed April 27, 1942 2 Sheets-Sheet 1

INVENTOR.
WALTER P. HILL
BY
W Bitterman Hulbert & Belknap
ATTORNEYS

April 4, 1944. W. P. HILL Re. 22,465

METHOD AND APPARATUS FOR SHAPING MEMBERS

Original Filed April 27, 1942 2 Sheets-Sheet 2

INVENTOR.

WALTER P. HILL

BY W. Lutterworth Hulbert & Belknap

ATTORNEYS

Reissued Apr. 4, 1944 Re. 22,465

UNITED STATES PATENT OFFICE 22,465

METHOD AND APPARATUS FOR SHAPING MEMBERS

Walter P. Hill, Detroit, Mich., assignor, by mesne assignments, to Calumet and Hecla Consolidated Copper Company, Calumet, Mich., a corporation of Michigan Original No. 2,313,474, dated March 9, 1943, Serial No. 440,713, April 27, 1942. Application for reissue March 15, 1943, Serial No. 479,283

14 Claims. (Cl. 153—21)

More particularly, this invention relates to a method and a tool for shaping stock to conform the latter to the contour of a portion of the tool and is a continuation in part of my copending application, Serial No. 366,757, filed November 22, 1940.

One of the principal objects of this invention is to control the flow or distribution of the stock during the forming operation in such a manner that the stock may be deformed to a substantial degree without the danger of overheating or otherwise injuring the stock.

In accordance with this invention, sufficient pressure is initially exerted around the entire circumference of the stock to progressively heat the stock to a plastic condition and thereafter a forming pressure is exerted on a continuous area of the stock extending over a major portion of the circumference of the stock while leaving the remaining portion free to deform in response to the forming pressure. The arrangement is such that successive portions of the stock are free to distort or deform during the forming operation and this is desirable because it prevents seizure between the stock and tool due to thermal expansion.

Another object of this invention is to provide a tool having a "heat ring" for exerting the required initial pressure on the stock to heat the latter and having a relief area in the forming portion to enable successive portions of the stock to deform or distort during the forming operation.

A further object of this invention is to thoroughly work the stock during the forming operation by one or more of the edges defining the relief portion of the tool. As a result, the stock is maintained in a plastic or easily workable condition and distribution of the stock is controlled to obtain the desired stock thickness in the completed article.

In addition to the foregoing, this invention contemplates a tool rendering it possible to close the ends of relatively large diameter tubes or casings and, at the same time, enables thickening the metal at the closed ends to practically any specified thickness. This feature of the invention is highly advantageous because it offers the possibility of eliminating the orthodox forging processes which were heretofore required in the manufacture of thickened closed end tubes or casings which are extremely expensive and very slow from a production standpoint.

Still another object of this invention is to form the stock to a predetermined length and internal diameter during the forming operation.

The foregoing, as well as other objects, will be made more apparent as this description proceeds, especially when considered in connection with the accompanying drawings, wherein.

Figure 1:
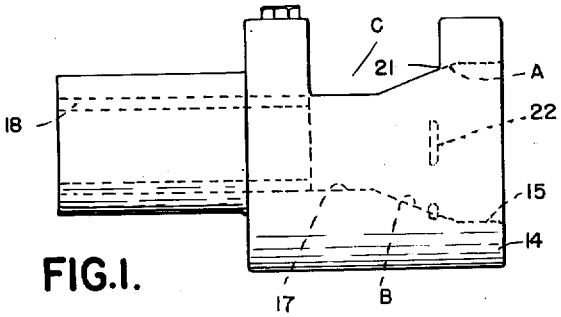
Figure 1 is a side elevation of a reducing tool constructed in accordance with this invention.
Figure 2:
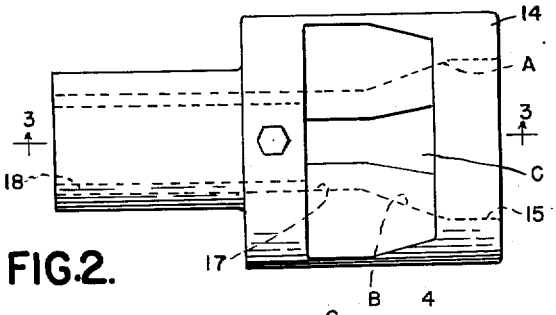
Figure 2 is a top plan view of the tool shown in Figure 1.

Referring generally to the embodiments of the invention shown in Figures 1 to 7, inclusive, 10 and 11, it will be noted that in each of these modifications a length of tubular stock is fashioned to the contour of the tool by exerting a reducing pressure on the stock as the latter and tool are relatively rotated and moved in directions toward each other. Briefly, each of the tools is provided with a continuous annular portion A which gradually decreases in cross section and exerts a reducing pressure continuously around the entire circumference of the stock to progressively heat the latter to a plastic or easily workable condition.

The stock leaving the annular heating portion A enters a cavity B also formed in the tool and has a portion which progressively decreases in cross section longitudinally of the tool. This portion of the cavity is formed with a relief recess C which extends longitudinally substantially throughout the length of the cavity B and has an area which is relatively small as compared to the area of the stock confining wall portion of the cavity. As a result, the wall portion of the cavity exerts a reducing pressure on a continuous area extending over a major portion of the circumference of the stock and the remaining portion of the stock is free to deform into the relief recess in response to the reducing pressure.

By providing the relief area, seizure between the stock and tool due to thermal expansion is eliminated and the excess metal resulting from the reduction in cross-section of the stock is accommodated and allowed to remain in a plastic state, but is not overheated. The reduction continues in accordance with the confining portion of the tool and in accordance with the shape of the tool until it is arrested by either discontinuing the operation of the tool or by a positive stop provided for this purpose.

It will also be noted that as successive portions of the stock deform into the relief recess, the stock is thoroughly worked by one or both longitudinal edge portions of the recess and, as a result, is maintained in a plastic or easily workable condition, which permits uniform or controlled distribution of the stock to obtain the desired configuration and thickness in the completed article.

All of the above principles may be individually or collectively used to advantage in working stock of metallic or non-metallic material to various different shapes and specified sizes. However, in order to more clearly illustrate the invention, I have shown in Figure 5 one type of article capable of being inexpensively produced from a length of tubular stock with the minimum number of operations and with relatively simple apparatus. The article in Figure 5 comprises a body 10 of tubing having one end fashioned to form an inwardly tapering portion 11 and having a reduced annular nipple 13 projecting axially from the tapering portion 11. The tubing may be ferrous, non-ferrous or plastic, and the nipple may be of any desired length. In fact, the entire length of the tubular stock may be reduced to the size of the nipple 13 if desired.

With the above in mind, reference will now be made more in detail to the tool illustrated in Figures 1 to 4, inclusive. The tool is in the form of a female die 14 having an entrant opening 15 of sufficient diameter to receive one end of the tube 10 and having an axially extending bore 17 connected to the entrant opening 15 by the cavity B and heat ring C. The cavity B and heat ring C progressively decrease in cross sectional area from the entrant opening 15 to the bore 17 and cooperate to form the flared portion 11 of the article shown in Figure 5. The reduced bore 17 forms the nipple 13 of the article having an external diameter determined by the internal diameter of the bore 17 and having a length determined by an adjustable stop 18 slidably supported in the bore 17. It will further be noted from Figures 1 to 4, inclusive, that the tool 14 is provided with at least one relief portion C, illustrated in the drawing as an open segment, in the form of a slot or groove extending in the direction of the axis of the tool and having a length closely approximating the length of the working zone or area of the tool. The purpose of the relief portion or portions C is to relieve the reducing pressure on successive portions of the tube 10 and permit relatively free distortion or expansion of the stock into the relief portion throughout the extent of working of the tube.

Figure 4A:
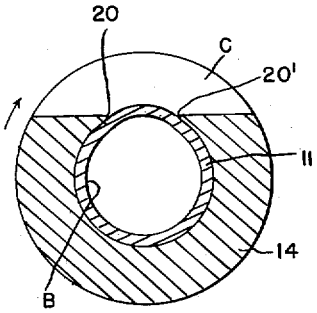
Figure 4A is a cross sectional view similar to Figure 4 showing a modified form of construction.
Figure 3:
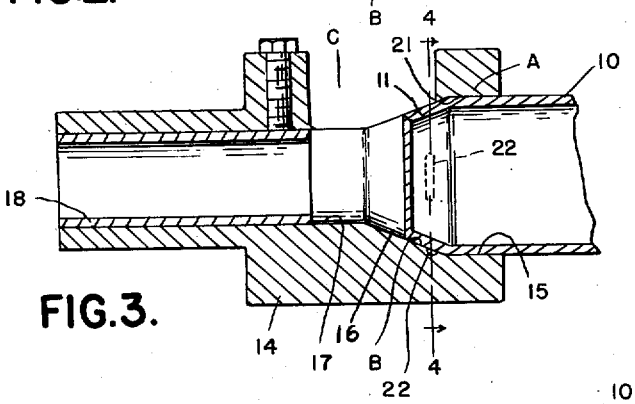
Figure 3 is a sectional view taken substantially on the line 3—3 of Figure 2 and showing a piece of stock engaged by the tool.
Figure 5:
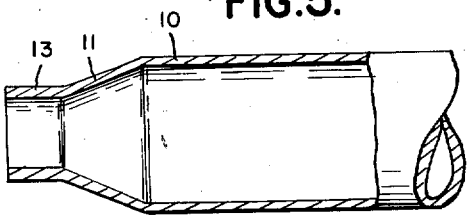
Figure 5 is an elevational view partly in section of a portion of one article capable of being produced by this invention.
Figure 4:
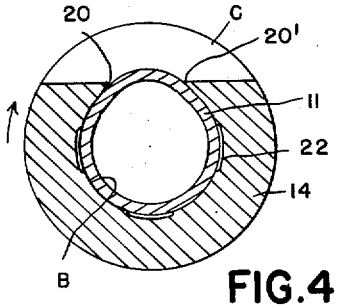
Figure 4 is a cross sectional view taken on the line 4—4 of Figure 3.

Assuming for the purpose of illustration that the tool is moved about its axis in a clockwise direction as viewed in Figure 4, it will be noted that the edge 20 of the relief portion C works the tubular stock to not only "iron out" any enlargement of the tube but to, also, control the distribution of the stock. It follows, of course, that in the event of the tool is moved about the axis in the opposite or in a counterclockwise direction, as viewed in Figure 4, the edge 20′ of the relief portion C works the stock in a similar manner. In fact, both the edges 20 and 20′ may be employed to work the tubular stock as the latter and tool are relatively angularly moved about the axis of the tool. In Figure 4A, I have shown the edge 20′ of the relief portion C as extending into the cavity of the die or tool. Assuming for the purpose of explanation that the tool is moved about its axis in a clockwise direction as viewed in Figure 4A, it will be noted that the stock is worked by the edge 20′ of the relief portion as well as by the edge 20.

The tool 14 and tube 10 are not only supported for relative movement about the axis of the tool but are, also, relatively movable toward each other to extend one end of the tube 10 into the entrant opening 15 in the tool. As the free end of the tube 10 engages the inwardly tapering wall of the cavity B, the end of the tube is engaged by one or the other of the edges 20 and 20′ (depending upon the direction of oscillation or rotation of the tool and tube) and the end of the tube is shaved to form the same perfectly square. It may also be pointed out at this time that the edge 21 of the relief portion C of the tool is spaced from the outer end of the entrant opening 15 to form the continuous annular tapered heat ring A which exerts a continuous initial reducing pressure around the entire circumference of the stock as the latter and tool are relatively moved in directions toward one another. As a result, the stock is progressively heated to a plastic or workable condition as it enters the cavity B and the extent to which the stock is heated may be controlled by varying the location of the edge 21 relative to the outer end of the entrant opening 15.

As relative movement of the tool 14 and tube 10 continues in directions toward each other, the tapering portion 16 of the tool applies a reducing pressure on the stock, and the tool as a whole controls the flow and distribution of the stock and forms the end portion thereof to the contour of the tool. As stated above, the pressure is relieved on successive portions of the stock during the forming operation by the relief portion C in the tool and, as a result, these portions are free to enlarge or deform into the relief portion C. As successive portions of the stock are displaced into the relief portion C, the stock is effectively worked by either or both the edges 20 and 20′ of the relief portions, and the thickness of the stock is controlled within close limits. It will also be apparent, especially when considered in connection with Figure 4, that the thickness of the walls of the stock may be reduced, if desired, by actually shaving the stock with the trailing edge of the relief portion C during the forming operation.

The feeding operation is continued until the free end of the tube abuts the adjustable stop 18 which is located in the bore 17 in a position predetermined in dependence upon the desired length of the nipple 13. Particular attention is again called to the fact that the relief portion C extends from a position in close proximity to the entrant end of the cavity B of the tool to the stop 18 so that the stock is effectively worked during the forming operation and distribution of the stock is controlled. It may be pointed out at this time that by extending the relief portion C along the nipple 13, the exterior surface of the latter may be formed to within every close limits of a specified diameter by burnishing the same with one or the other of the edges 20 and 20' of the relief portion C.

Reference has been made above to the fact that the entire tube 10 may be reduced to the diameter of the bore 17. From the foregoing, it will be apparent that the length of the tube 10 may be reduced to the size of the bore 17 by merely eliminating the stop 18. The elimination of this stop permits unlimited relative feeding of the tool 14 and the tube 10 to form a continuous length of reduced tubing.

In some cases it may be desirable to provide additional stock in the zone of the forming operation, and one way that this may be accomplished is by providing one or more indentations 22 in the tapered surface 16 of the tool. These indentations permit the stock to "pile up" during the forming operation, and this stock is uniformly distributed by either or both of the edges 20 and 20' of the relief portion C. As a result, the thickness of the walls of the stock is increased in proportion to the amount of stock gathered by the indentations 22.

Figure 6:
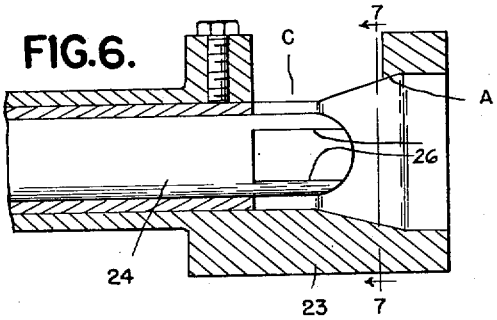
Figure 6 is a sectional view through a slightly modified form of tool.
Figure 7:
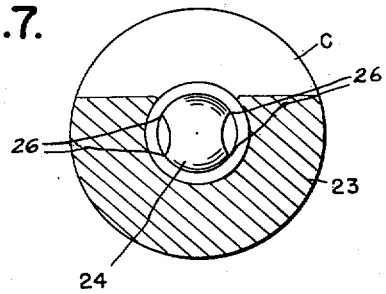
Figure 7 is a cross sectional view taken substantially on the line 7—7 of Figure 6.

In some cases it may be advantageous to form the internal diameter of the nipple 13 to a specified size, and this may be accomplished by the tool shown in Figures 6 and 7. As shown in the above figures, the tool 23 is similar in construction to the tool 14 previously described with the exception that a mandrel 24 is located in the reduced bore of the tool in concentric relation to the latter. The forward end of the mandrel 24 has one or more relief portions and is adapted to extend into the nipple 13. The edges 26 of the relief portions in the mandrel 24 cooperate to burnish or shave the inner surface of the reduced portion 13 to form the latter to a predetermined internal diameter. It follows, therefore, that the mandrel 24 cooperates with one or the other of the edges 20 and 20' of the relief portion C, extending along the reduced bore, to fashion the outside and inside diameters of the nipple to specified dimensions.

Figure 8:
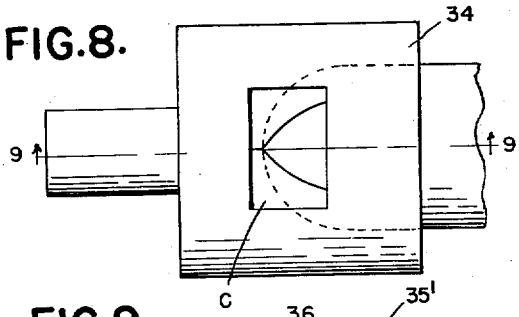
Figure 8 is a top plan view of a further embodiment of this invention.
Figure 9:
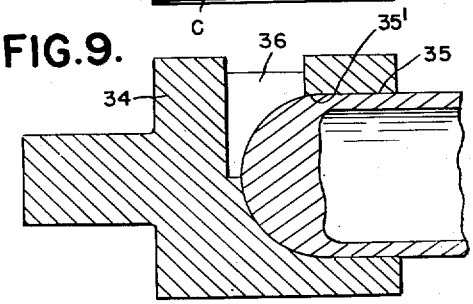
Figure 9 is a sectional view taken on the line 9—9 of Figure 8.
Figure 10:
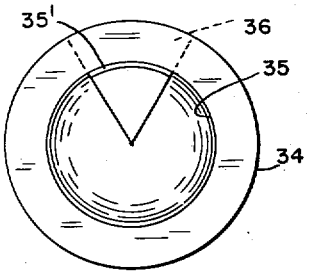
Figure 10 is an end elevational view of the construction shown in Figure 8.

In Figures 8 to 10, inclusive, of the drawings, I have illustrated a tool capable of working one end of a tube to close the latter end and, if desired, to also thicken the same. In detail, the tool 34 is provided with a recess or cavity 35 and with one or more relief portions 36 which extend to the axis of the tool in a manner clearly shown in Figure 10. The relief portion 36 performs the same results and operates in the same manner as the relief portion C previously described in detail. In addition, the tool 34 is provided with a continuous annular heat ring 35' for progressively heating the stock by exerting a reducing pressure continuously around the entire circumference of the stock as the latter enters the cavity or recess 35. This heat ring 35' is the equivalent of the heat ring A previously described and operates in the same manner as the latter to initially heat the stock to a plastic or easily workable condition.

The highly effective metal working and distribution characteristics of the tool previously described renders it possible to effectively close the ends of casings or tubes having a diameter and wall thickness of such magnitude that it was heretofore necessary to manufacture the same by a forging process which is not only considerably more expensive but is also much slower. Moreover, due to the nature of the stock distributing and control means, it is also possible to form the end of the tube or casing to various thicknesses and this is desirable in manufacturing certain types of articles such, for example, as shell casings.

Figure 11:
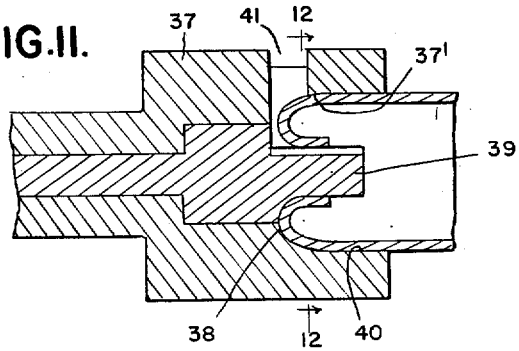
Figure 11 is a longitudinal sectional view illustrating a further embodiment of this invention.
Figure 12:
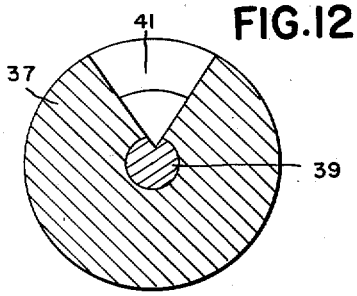
Figure 12 is a cross sectional view taken substantially on the plane indicated by the line 12—12 of Figure 11.

The embodiment of the invention shown in Figures 11 and 12 illustrates a tool 37 for forming a return bend 38 in a length of tubular stock. In detail the tool 37 is provided with a reduced axially extending portion 39 which is surrounded by an annular recess 40 corresponding in dimension to the desired size of the return bent 38. The annular portion 37' acts to heat and partially reduce the stock in the same manner as the portion A in Figures 1 to 4. In addition, the tool is fashioned with at least one relief portion 41 which extends into the reduced portion 39 or, in other words, extends throughout the length of the working portion of the tool. As a result, the relief portion 41 performs the same functions as the relief portion C, described in the first embodiment of the invention, in that it permits distortion and working of the stock to form the latter to the contour of the tool. In this connection, it will be noted from Figure 12 that the opposite side edges of the relief portion 41 correspond in contour to the return bent portion 38 of the stock, and one or the other of the edges of the relief portion controls the distribution of the stock as the latter is worked by the tool. It may also be pointed out that the edges of the relief portion formed in the reduced part 39 of the tool acts on the inner surface of the return bent portion and forms the same to a predetermined specified dimension.

What I claim as my invention is:

1. The method of forming stock which includes the steps of exerting a reducing pressure on a continuous area extending over a major portion of the circumference of the stock while leaving the remaining portion free to deform in response to the reducing pressure, and relatively rotating the stock and pressure exerting means thereby permitting circumferentially progressive deformation longitudinally of the stock in the area out of contact with the pressure exerting means.

2. The method of forming stock which includes the steps of progressively heating and partially reducing the stock by exerting a reducing pressure continuously around the entire circumference of the stock by a rotating means, and immediately further reducing the stock and working and distributing the material thereof by exerting a reducing pressure by a rotating means on a continuous area extending over a major portion of the circumference of the stock while leaving the remaining portion free to deform in response to the reducing pressure.

3. The method of forming stock which includes the steps of progressively heating and partially reducing the stock by exerting a reducing pressure continuously around the entire circumference of the stock by a rotating means, immediately further reducing the stock and working the material thereof by exerting a reducing pressure on a continuous area extending over a major portion of the circumference of the stock while leaving the remaining portion free to deform in response to the reducing pressure, and relatively rotating the stock and pressure exerting means thereby permitting circumferentially progressive deformation longitudinally of the stock.

4. Those steps in the method of shaping tubular stock which consist in simultaneously relatively rotating the stock and a shaping tool about the axis of the tool while relatively moving the tool and stock toward one another, initially circumferentially confining the stock continuously around the entire circumference thereof by said shaping tool to heat and partially conform the stock to the shape of the shaping tool, and immediately thereafter confining the stock on a continuous area extending over a major portion of its circumference sufficient to conform the stock to the shape of the shaping tool while relieving the confinement of the stock for a predetermined area longitudinally of the tool to thereby permit distortion of longitudinal portions of the stock into said relief area during the shaping operation.

5. Those steps in the method of shaping tubular stock which consist in simultaneously relatively rotating the stock and a shaping tool about the axis of the tool while relatively moving the tool and stock toward one another, initially circumferentially confining the stock continuously around the entire circumference thereof by said shaping tool to heat the stock to permit subsequent control of the distribution of the stock, and while the stock is so heated confining the stock on a continuous area extending over a major portion of its circumference sufficient to conform the exterior of the stock to the shape of the shaping tool while relieving the confinement of the stock for a predetermined area longitudinally of the tool to thereby permit distortion of longitudinal portions of the stock into said relief area during the shaping operation, and controlling distribution of the stock by the shape of the tool to control the wall thickness thereof.

6. Those steps in the method of shaping tubular stock without the application of external heat during the shaping operation which consist in simultaneously relatively rotating the stock and a shaping tool about the axis of the tool while relatively moving the tool and stock toward one another, initially circumferentially confining the stock continuously around the entire circumference thereof by said shaping tool to heat the stock to permit subsequent control of the flow of the stock, and while the stock is so heated confining the stock on a continuous area extending over a major portion of its circumference sufficient to conform the exterior of the stock to the shape of the shaping tool while relieving the confinement of the stock for a predetermined area longitudinally of the tool to thereby permit distortion of longitudinal portions of the stock into said relief area during the shaping operation, and controlling the flow of the stock by the confining and relief areas of the tool.

7. Those steps in the method of shaping tubular stock without the application of external heat during the shaping operation which consist simultaneously relatively rotating the stock and a shaping tool about the axis of the tool while relatively moving the tool and stock towards one another, initially circumferentially confining the stock continuously around the entire circumference thereof by said shaping tool to heat and partially conform the stock to the shape of the shaping tool, and immediately thereafter confining the stock on a continuous area extending over a major portion of its circumference sufficient to conform the stock to the shape of the shaping tool while relieving the confinement of the stock for a predetermined area longitudinally of the tool to thereby permit distortion of longitudinal portions of the stock into said relief area during the shaping operation, and controlling the flow of the stock by the confining and relief areas of the tool.

8. A forming tool for reducing stock having an axially extending cavity at least a portion of which is of progressively diminishing cross section longitudinally of the tool, the wall of said cavity being adapted to engage and reduce the stock upon relative rotation and axial movement toward one another of the stock and tool, said wall being provided with a relief recess extending longitudinally substantially throughout the length of said cavity, the area of the stock engaging wall of the cavity being substantially greater than the area of said relief recess whereby a major portion of the circumference of the stock is engaged by the tool during the reducing operation leaving the remaining portion free to deform into said relief recess in response to the reducing operation.

9. A forming tool for reducing stock having a continuous annular portion adapted to engage the stock throughout its circumference to partially reduce and heat the stock upon relative rotation and axial movement toward one another of the stock and tool, and a second reducing portion having an axially extending cavity at least a portion of which is of progressively diminishing cross section longitudinally of the tool, the wall of said cavity being adapted to engage and reduce the stock upon relative rotation and axial movement toward one another of the stock and tool, said wall being provided with a relief recess extending longitudinally substantially throughout the length of said cavity, the area of the stock engaging wall of the cavity being substantially greater than the area of said relief recess whereby a major portion of the circumference of the stock is engaged by the tool during the reducing operation leaving the remaining portion free to deform into said relief recess in response to the reducing operation.

10. A forming tool for reducing stock having an axially extending cavity at least a portion of which is of progressively diminishing cross section longitudinally of the tool, the wall of said cavity being adapted to engage and reduce the stock upon relative rotation and axial movement toward one another of the stock and tool, said wall being provided with a relief recess extending longitudinally substantially throughout the length of said cavity, the area of the stock engaging wall of the cavity being substantially greater than the area of said relief recess whereby a major portion of the circumference of the stock is engaged by the tool during the reducing operation leaving the remaining portion free to deform into said relief recess, one of the edges defining the juncture of the cavity wall and relief recess being shaped to work the stock during said reducing operation.

11. A forming tool for reducing tubular stock having an axially extending cavity at least a portion of which is of progressively diminishing cross section longitudinally of the tool, the wall of said cavity being adapted to engage and reduce the stock upon relative rotation and axial movement toward one another of the stock and tool, said wall being provided with a relief recess extending longitudinally substantially throughout the length of said cavity, the area of the stock engaging wall of the cavity being substantially greater than the area of said relief recess whereby a major portion of the circumference of the stock is engaged by the tool during the reducing operation leaving the remaining portion free to deform into said relief recess, and means coaxial with said cavity adapted to extend into the stock to control the internal diameter thereof.

12. A forming tool for reducing stock having an axially extending cavity at least a portion of which is of progressively diminishing cross section longitudinally of the tool, the wall of said cavity being adapted to engage and reduce the stock upon relative rotation and axial movement toward one another of the stock and tool, said wall being provided with a relief recess extending longitudinally substantially throughout the length of said cavity, the center line of said relief recess and the axis of the tool being substantially in the same plane, the area of the stock engaging wall of the cavity being substantially greater than the area of said relief recess whereby a major portion of the circumference of the stock is engaged by the tool during the reducing operation leaving the remaining portion free to deform into said relief recess in response to the reducing operation.

13. A forming tool for reducing stock having a continuous annular portion adapted to engage the stock throughout its circumference to partially reduce and heat the stock upon relative rotation and axial movement toward one another of the stock and tool, and a second reducing portion having an axially extending cavity at least a portion of which is of progressively diminishing cross section longitudinally of the tool, the wall of said cavity being adapted to engage and reduce the stock upon relative rotation and axial movement toward one another of the stock and tool, said wall being provided with a relief recess extending longitudinally substantially throughout the length of said cavity, the center line of said relief recess and the axis of the tool being substantially in the same plane, the area of the stock engaging wall of the cavity being substantially greater than the area of said relief recess whereby a major portion of the circumference of the stock is engaged by the tool during the reducing operation leaving the remaining portion free to deform into said relief recess, one of the edges defining the juncture of the cavity wall and relief recess being shaped to work the stock during said reducing operation.

14. In a method of forming stock, the steps of relatively moving said stock and a forming tool simultaneously in axial and rotational directions, initially partially reducing and frictionally heating the stock by a portion of said tool extending around the entire circumference of the stock, and immediately thereafter exerting a confining and progressively reducing pressure upon the circumference of the stock on opposite sides of the center thereof by another portion of said tool while leaving a segment of said circumference less than the diameter of the stock at each stage of its progressive reduction free to deform in response to and slightly in relief of said pressure.

WALTER P. HILL.